US008447804B2

(12) United States Patent
Bai et al.

(10) Patent No.: US 8,447,804 B2
(45) Date of Patent: May 21, 2013

(54) INFORMATION GATHERING SYSTEM USING MULTI-RADIO TELEMATICS DEVICES

(75) Inventors: Fan Bai, Ann Arbor, MI (US); Donald K. Grimm, Utica, MI (US); John J. Correia, Livonia, MI (US)

(73) Assignee: GM Global Technology Operations LLC, Detroit, MI (US)

(*) Notice: Subject to any disclaimer, the term of this patent is extended or adjusted under 35 U.S.C. 154(b) by 227 days.

(21) Appl. No.: 12/974,110

(22) Filed: Dec. 21, 2010

(65) Prior Publication Data

US 2012/0158820 A1 Jun. 21, 2012

(51) Int. Cl.
*G06F 15/173* (2006.01)

(52) U.S. Cl.
USPC ............ 709/203; 709/220; 709/225; 709/228

(58) Field of Classification Search
USPC .................... 709/203, 220, 225, 228; 370/328
See application file for complete search history.

(56) References Cited

U.S. PATENT DOCUMENTS

| | | | | |
|---|---|---|---|---|
| 6,735,630 | B1 * | 5/2004 | Gelvin et al. | 709/224 |
| 7,339,905 | B2 * | 3/2008 | Bjorklund et al. | 370/328 |
| 7,492,248 | B1 * | 2/2009 | Bjorkland et al. | 340/7.2 |
| 7,844,687 | B1 * | 11/2010 | Gelvin et al. | 709/220 |
| 8,140,658 | B1 * | 3/2012 | Gelvin et al. | 709/224 |
| 2007/0064887 | A1 * | 3/2007 | Bjorklund et al. | 379/88.17 |
| 2007/0087756 | A1 * | 4/2007 | Hoffberg | 455/450 |
| 2010/0100327 | A1 * | 4/2010 | Jensen | 702/2 |
| 2011/0035491 | A1 * | 2/2011 | Gelvin et al. | 709/224 |
| 2012/0179374 | A1 * | 7/2012 | Jensen et al. | 702/2 |

* cited by examiner

*Primary Examiner* — Khanh Dinh
(74) *Attorney, Agent, or Firm* — Parks IP Law LLC; Mickki D. Murray

(57) ABSTRACT

The present disclosure relates to a method for intelligent procurement of data from a plurality of vehicles in a data-aggregation region using long-range communications, short-range communications, and group leader vehicles. The method includes a central server defining a plurality of data-aggregation areas and identifying at least one group leader vehicle in each data-aggregation area. The method also includes the group leader vehicle in each data-aggregation area collecting data from other vehicles in the data-aggregation area using short-range communications and the group leader vehicle in each data-aggregation area determining to cease collecting data from the other vehicles in the data-aggregation area. The method further includes the group leader vehicle in each data-aggregation area generating a consensus report using the data collected from the other vehicles in its data-aggregation area.

20 Claims, 3 Drawing Sheets

INFORMATION GATHERING SYSTEM USING MULTI-RADIO TELEMATICS DEVICES

TECHNICAL FIELD

The present disclosure relates generally to systems and methods for gathering information and, more particularly, to systems and methods for gathering information such as telematics data using multi-radio telematics devices.

BACKGROUND

Modern automobiles include an on-board computer controlling select vehicle functions and providing the vehicle and driver with various types of information. For example, on-board computers control select engine and suspension functions and facilitate communications with other vehicles and remote driver-assistance centers. For instance, the OnStar® system, of the General Motors Corporation, provides services including in-vehicle safety and security, hands-free calling, turn-by-turn navigation, and remote-diagnostics systems.

On-board computers also facilitate delivery to the driver of information and entertainment (referred to collectively as infotainment), such news feeds, weather, sports, and notifications about vehicle location and nearby traffic. Messages transmitted to vehicles can also include new software for the on-board computer, or upgrades or updates to existing software.

Many conventional telematics communication systems transmit messages to on-board computers using only cellular telecommunication. That is, a remote server of the system establishes a wireless connection, over a cellular telecommunication network, with each vehicle for which it has information.

This traditional reliance on the cellular network has various drawbacks. For example, extensive use of the cellular network causes congestion and the cost of transmitting each message to every participating vehicle, or even to a subset of the vehicles, is relatively high.

SUMMARY

The present disclosure relates to a method for intelligent procurement of data from a plurality of vehicles in a data-aggregation region using long-range communications, short-range communications, and group leader vehicles. The method includes a central server defining a plurality of data-aggregation areas and identifying at least one group leader vehicle in each data-aggregation area. The method also includes the group leader vehicle in each data-aggregation area collecting data from other vehicles in the data-aggregation area using short-range communications and the group leader vehicle in each data-aggregation area determining to cease collecting data from the other vehicles in the data-aggregation area. The method further includes the group leader vehicle in each data-aggregation area generating a consensus report using the data collected from the other vehicles in its data-aggregation area.

The present disclosure also relates to a data-aggregation protocol stored on a tangible non-transient, computer-readable medium as instructions that: when executed by a processor of a central server cause the processor of the central server to define a plurality of data-aggregation areas and when executed by processors of vehicles in each data-aggregation area cause the processors to communicate to identify at least one group leader vehicle for the data-aggregation area. The instructions also, when executed by a processor of the identified group leader vehicle in each data-aggregation area causes the processor of the identified group leader vehicle to: (i) collect data from processors of other vehicles in the data-aggregation area using short-range communications, (ii) determine to cease collecting data from the other vehicles in the data-aggregation area; and (iii) generate a consensus report using the data collected from the other vehicles in its data-aggregation area.

Other aspects of the present invention will be in part apparent and in part pointed out hereinafter.

DETAILED DESCRIPTION

Figure 1:
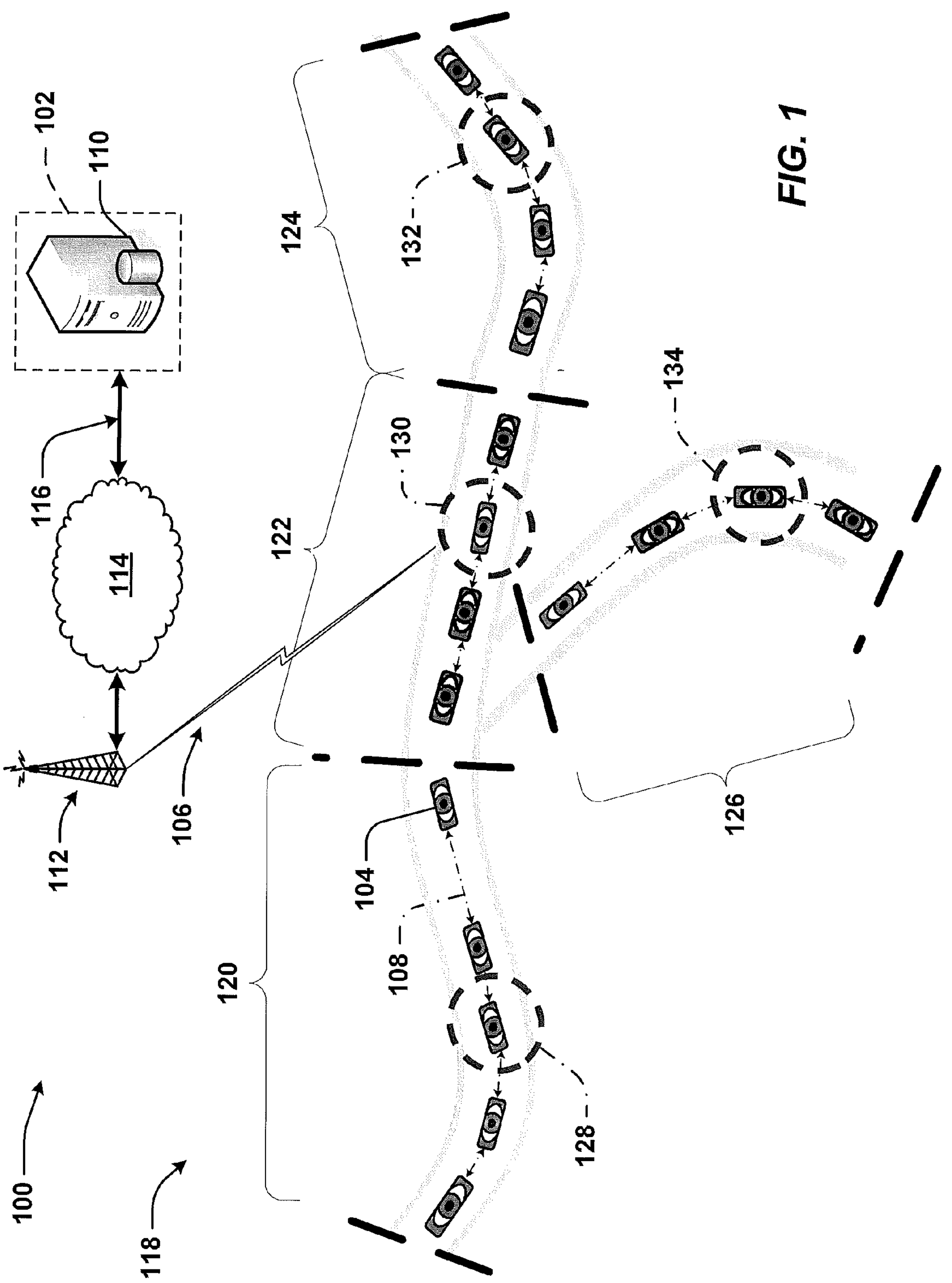
FIG. 1 illustrates a system for aggregating information from a plurality of geographically-dispersed vehicles by way of short-range communications between vehicles and long-range communications from at least one selected aggregation vehicle, according to an embodiment of the present disclosure.

As required, detailed embodiments of the present disclosure are disclosed herein. The disclosed embodiments are merely examples that may be embodied in various and alternative forms, and combinations thereof. As used herein, for example, "exemplary," and similar terms, refer expansively to embodiments that serve as an illustration, specimen, model or pattern. The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

While the description includes a general context of computer-executable instructions, the present disclosure can also be implemented in combination with other program modules and/or as a combination of hardware and software. The terms "application," "algorithm," "program," "instructions," or variants thereof, are used expansively herein to include routines, program modules, programs, components, data structures, algorithms, and the like, as commonly used. These structures can be implemented on various system configurations, including single-processor or multiprocessor systems, microprocessor-based electronics, combinations thereof, and the like. Although various algorithms, instructions, etc. are separately identified herein (e.g., data-aggregation algorithm), various such structures may be separated or combined in various combinations across the various computing platforms described herein.

I. GENERAL OVERVIEW

The present disclosure describes systems, methods, and computer-readable media for obtaining information from a plurality of geographically dispersed vehicles. The nature of information obtained is not limited, and may include a variety of information types, such as telematics information. Telematics information is used broadly herein to refer to any type of information related to a vehicle or operation thereof, such as information about vehicle-operation parameters, traffic, weather, road conditions, operator preferences, needs, or qualities, and vehicle preferences or needs.

According to embodiments of the present disclosure, as described in detail below, information is uploaded from group leader vehicles over a long-range communications network (e.g., a cellular telecommunication network) to a central data-aggregation server. The group leader vehicles receive information from nearby vehicles in their respective areas using relatively short-range communications, such as Dedicated Short-Range Communications (DSRC). Although short-range communications are primarily disclosed herein with respect to vehicle-to-vehicle (V2V) communications, longer-range communications, such as what may be categorized as medium-range communications, may also be used with the embodiments of the present disclosure.

The techniques of the present disclosure may also be used in combination with vehicle-to-infrastructure (V2I), vehicle-to-pedestrian (V2P) or other vehicle-related (V2X) communications, including various types of wireless networks, such as mobile ad hoc networks.

Thus, although the present invention is primarily described for illustration purposes with respect to V2V systems, wherein system nodes include automotive vehicles, the present disclosure can be used to improve collection of information from other types of nodes, such as pedestrians carrying mobile devices.

The technology of the present disclosure creates and makes efficient use of a multi-tier system including a long-range communication tier and a short-range communication tier. Efficiencies are accomplished in part by intelligent cross-tier communications, as described further herein.

While certain functions of the present disclosure are described primarily as being performed by a certain acting entity for purposes of illustration, such as a central server, various functions of the present disclosure may be performed by one or any combination of entities selected from the central server, system operating personnel, and one or more of the on-board computer systems.

II. SYSTEM ARCHITECTURE

Turning now to the figures, and more particularly to the first figure, FIG. 1 illustrates a system 100 for intelligently providing information to a remote sub-system 102, such as a traffic center, from multiple dispersed vehicles 104 by way of long-range communications 106 and short-range communications 108 between vehicles 104. For ease of illustration, not every long-range communication 106 and short-range communication 108 is shown.

The remote sub-system 102 includes a central data server 110, which may be a part of a customer-service center, such as an OnStar® monitoring center or other traffic-related center. Among other functions, the central server 110 obtains telematics data from participating vehicles 104.

The central server 110 can also initiate information messages for delivery to the on-board computer of each vehicle 104 of the system 100 or a sub-set of the vehicles 104. The messages initiated by the central server 110 may include any of a variety of information, such as software upgrades or updates, instructions for vehicle users, news, traffic, weather, etc. Messages initiated by the central server 110 may also include requests for data, which initiate data-aggregation by the vehicles 104 as described herein.

Although a single central server 110 is primarily described, it will be appreciated that the remote-subsystem 102 can include any number of computer servers, connected and/or independent, in the same and/or various geographic locations. Messages, such as an instruction message or inquiry message requesting data or data aggregation according to the present technology, sent from the remote-subsystem 102 may be initiated by the server 110 (e.g., a periodic software update or a severe weather advisory received from the National Weather Service) or an operator of the system 100, such as personnel at the remote sub-system 102 (e.g., monitoring-center operator).

Each participating vehicle 104 includes short-range communication hardware (interface, programming, etc.) for receiving and sending short-range communications. At least some of the vehicle 104 must have hardware, including multi-radio communication devices, and programming for long-range communications, such as a cellular interface (not shown in detail). In one embodiment, only vehicles with dual radios (cellular or short-range) are qualified to be leaders, and so leaders are selected only amongst this group.

Each vehicle 104 includes an on-board computer (not shown in detail) having a processor, and a memory storing computer-readable instructions executable by the processor to perform various functions. Functions of the on-board computer include communication with the on-board computers of other vehicles 104, vehicle control, emergency notifications and other presentation of information to the driver, and, for vehicles having software and hardware (e.g., multi-radio components) for long-range communications, communication with the remote sub-system 102, e.g., traffic center.

With further reference to FIG. 1, the long-range communications 106 are sent to or at least received from vehicles 104. The long-range communications 106 may include, for example, cellular communications via one or more cellular base station transceivers 112, such as a base transceiver station (BTS). The long-range communications may also include a roadside transmitter or transceiver, or other transportation network infrastructure (not shown) using relatively long-range communication technology. Although transportation infrastructure components, such as roadside transceivers, are mentioned herein, in some embodiments it is preferred to avoid reliance on such infrastructure, thereby reducing the need and cost to implement the infrastructure components, or to ensure proper development, locating, maintenance, and implementation of the same.

The system 100 and messages may be configured so that the messages pass to and from the remote-subsystem 102 via the base station transceiver(s) 112 and any of a variety of intermediary networks 114, such as the Internet, and wireless and/or landline channels 116.

Short-range communications 108 may include one or more short-range communication protocols, such as DSRC, WI-FI®, BLUETOOTH®, infrared, infrared data association (IRDA), near field communications (NFC), the like, or improvements thereof (WI-FI is a registered trademark of WI-FI Alliance, of Austin, Tex.; and BLUETOOTH is a registered trademark of Bluetooth SIG, Inc., of Bellevue, Wash.).

III. DATA-AGGREGATION AREAS

In some embodiments, the central server 110, or other component, identifies a data-aggregation region 118 from which the server 110 desires data. In various embodiments the data-aggregation region 118 is defined in any of a variety of ways, including by geographic coordinates (e.g., latitude and longitude) or global-positioning-system (GPS) coordinates. In some scenarios, the data-aggregation region 118 corresponds to a municipal boundary, such as a city, state, or country, or portions thereof.

The central server 110 identifies one or more data-aggregation areas 120, 122, 124, 126 from which the server 110 desires data. For embodiments in which a data-aggregation region 118 is identified, the server 110 may identify data-aggregation areas 120, 122, 124, 126 of the region 118. The boundaries of the data-aggregation areas 120, 122, 124, 126 are in various embodiments described in any of a variety of ways, including by geographic coordinates (e.g., latitude and longitude) or global-positioning-system (GPS) coordinates. In some embodiments, one or more of the data-aggregation areas 120, 122, 124, 126 correspond to segments of one or more vehicle routes such as roads (e.g., highways).

Data-aggregation areas 120, 122, 124, 126 are in some embodiments dynamic, or depend on variables, and are in some embodiments static, or pre-set. For example, the central server 110 or personnel of the remote sub-system 102, e.g., traffic center, may determine based on historic travel and vehicle-concentration patterns, for example, that a certain downtown area, or rural highway, should be divided into a certain number of areas having one or more certain sizes and shapes for all or certain types of information procurement going forward, without need to evaluate more of-the-moment data at the time of each procurement.

It is noted that even with static areas, the server 110 or personnel of the remote sub-system 102 can of course improve the static areas, such as based on performance of the system 100 and/or feedback over time and so they are not completely static in this way. Such improvements to definitions of static areas, or evaluation in contemplation of such improvements could be performed periodically, such as weekly, monthly, or quarterly. Embodiments in which static areas are prescribed and regularly updated can be referred to as hybrid zoning.

Variables for dynamically defining aggregation areas 120, 122, 124, 126 include, in various embodiments, any one or more of: (i) historic vehicle concentration within the data-aggregation region 118, (ii) present vehicle concentration within the data-aggregation region 118, (iii) size of the area (s), (iv) desired timing for procuring the message to the vehicles 104 in the region 118, (v) desired accuracy for the data being procured, and others.

The data-aggregation algorithm may be configured to cause the central sever 110 to define any number, size, and shape of aggregation areas 120, 122, 124, 126. Exemplary shapes for the aggregation areas 120, 122, 124, 126 include pentagon, hexagon, other regular or irregular polygons, circle, oval, and non-descript shapes (shapes not being associated traditionally with a name). And, as provided, the boundaries of the data-aggregation region 118 and the aggregation areas 120, 122, 124, 126 are in various embodiments described in any of a variety of ways, including by geographic coordinates (e.g., latitude and longitude) or global-positioning-system (GPS) coordinates.

In some scenarios, areas 120, 122, 124, 126 are associated with a road or select stretches of the same. In these scenarios, the zone can be generally considered as being one-dimensional (1-D). For example, fifty miles of rural highway may be divided into five data-aggregation areas 120, 122, 124, 126 of generally equal or different lengths.

IV. SELECTION OF GROUP LEADER(S)

For aggregating data from the vehicles 104 in the system 118, one or more group leaders, or virtual group leaders 128, 130, 132, 134 are selected. For example, in some embodiments, one or more group leaders 128, 130, 132, 134 are selected from the vehicles 104 in each data-aggregation area 120, 122, 124, 126. As provided, the present technologies are applicable similarly to scenarios in which some or all of the vehicles 104, as described, are instead non-vehicle computing nodes.

The selection of group leaders 128, 130, 132, 134 may be performed by the central server 110 and/or by the vehicles 104 executing a data-aggregation computer algorithm. The data-aggregation algorithm, or at least a portion thereof, is stored in computer-readable media of the central server 110 and in at least some of the vehicles 104. The algorithm in the vehicles 104 can instruct the vehicles on functions such as selecting a group leader, providing data to a selected group leader (in response to a request, or without such prompting), and, at least for vehicles selected as group leaders, requesting data from the other, peer, vehicles, forming consolidated data reports, and uploading the reports to the remote sub-system 102 (e.g., traffic center). It is also contemplated that all or some instructions on which the vehicles 104 act could be provided in messages (e.g., instruction or request message) initiated at the remote sub-system 102.

Group leader selection may be performed by the vehicles 104 in response to a response or inquiry message from the remote sub-system 102, or within the sub-system 102 by such prompting from within the sub-system 102 itself or another component of the system 100. These or other initiating events may in turn be initiated by another trigger, such as a request from one or more entities (e.g., a vehicle 104, a news-reporting entity, traffic center, etc.) requesting relevant information, such as information about a traffic accident, or traffic in a certain locale.

Group leaders 128, 130, 132, 134 may be selected in various ways. In some embodiments, group leaders 128, 130, 132, 134 are selected according to an arbitrary technique configured to identify a specific number of group leaders, such as one per data-aggregation area 120, 122, 124, 126. In other embodiments, group leaders 128, 130, 132, 134 are selected according to an intelligent process configured to strategically identify one or more vehicles 104 that would make for a beneficial group leader for one or more reasons.

In some contemplated implementations, more than one group leader is selected for a designated zone (e.g., data-aggregation area 120, 122, 124, 126), such as when information is desired more quickly (e.g., a latency, or delay, tolerance is low), or more accurate information is desired, even at the expense of increased use of long-range communications. It will be appreciated that similar results might be accomplished by defining more data-aggregation areas 120, 122, 124, 126, resulting in a reduced size of such areas, if associated with the same region 218.

A. Arbitrary Selection

The data-aggregation algorithm is in some embodiments configured to identify a desired discrete number of group leaders 128, 130, 132, 134, such as one leader per data-aggregation area 120, 122, 124, 126. One method of selecting the desired number of group leaders is by selecting group leaders based on one or more distinguishing characteristic of the vehicles 104.

In one embodiment, group leaders are selected based on an identifying indicator, such as vehicle identification number (VIN), short-range communication radio identification, on-board computer identification, or any other determinable indicator distinct to each vehicle 104. The group leaders may be selected, for example, as being the vehicle(s) 104 having the lowest, or highest, such identification number per data-aggregation area 120, 122, 124, 126.

In embodiments in which the vehicles 104 themselves determine the group leader(s), each vehicle 104 broadcasts its identifying indicator to its peers 104 in the same data-aggregation area 120, 122, 124, 126 (e.g., road segment). The broadcasts may be made via short-range communications, such as via DSRC, WI-FI®, etc., and using one hop or multi-hop routing.

It is contemplated that broadcasts from the vehicles 104 could include an indication relating to a location of the broadcasting vehicle 104. For instance, each broadcast could include geographic coordinates and/or an indication of a data-aggregation area 120 in which it is located. In this way, vehicles 104 can determine to ignore information from a vehicle in a neighboring area 122, and unwanted scenarios related to overlap are avoided, such as when vehicles in one area are able to short-range communicate with vehicles in an adjacent area. Such potential unwanted scenarios include the non-designation of any vehicle as leader in an area because the vehicle 104 having the highest identification number in the area received a broadcast from another, nearby vehicle, though being in an adjacent area 122, having a higher identification number.

For arrangements in which the broadcast of each vehicle 104 in the area 120, 122, 124, 126 reaches each other vehicle in the area, such as where areas are sized so that each vehicle is within short range of each other vehicle, or within a hop or a few hops of each other, each vehicle 104 can easily determine whether it is to be the group leader based on the data-aggregation algorithm. For instance, if (i) a particular vehicle 104 has an identifying indicator of 6781, (ii) no identifying indicator received from the other vehicles 104 in the area is above 6781, and (iii) the data-aggregation algorithm determines that the highest indicator is the group leader, than the particular vehicle 104 assumes the role of group leader 128. Similarly, the other vehicles 104 in the area will determine that they are not the group leader, having received at least the 6781 indicator being higher than theirs.

B. Strategic Selection

As provided, in some embodiments, group leaders 128, 130, 132, 134 are selected according to an intelligent protocol configured to strategically identify one or more vehicles 104 that would, for one or more reasons, be a beneficial group leader. The intelligent protocol could identify group leaders 128, 130, 132, 134 based on factors that would be beneficial to the remote sub-system 102, the vehicles 104, and/or the entire system 118. Benefits may relate to any one or more of a variety of areas, such as financial cost, speed of operation, and accuracy of aggregated information.

In one embodiment, the protocol selects a vehicle 104 having a lowest or highest characteristic associated with cellular-communication plans of the vehicles 104. For instance, in a particular embodiment, the protocol selects the group leader 128, 130, 132, 134 for the area 120, 122, 124, 126 as the vehicle 104 having the lowest usage level, or highest remaining usage, to date in its cellular-communication plan. For example, if each of four particular vehicles 104 in an area 120 is associated with a corresponding cellular-communication account allocating a certain number of base minutes (or blocks, or other value (e.g., dollars)) to use each month, the vehicle 104 having the most minutes remaining can be selected as the group leader 128.

The allotment evaluated may include a number of minutes, a percentage or ratio of allotments used, such that a vehicle having 10% present usage of its cell-plan allotment is preferred over a vehicle having 20% present usage, of the same or a different sized allotment. Benefits of these approaches include vehicles 104 in the system 100 being less likely to exceed long-range-communication account allotments, and so avoiding additional cost. Also by these approaches, it is ensured that the selected group leader is enabled for cellular communications.

In some contemplated embodiments, the data-aggregation protocol includes one or more tie-breaking techniques for cases in which two or more vehicles 104 have the same subject characteristic. For instance, if one leader is sought and two vehicles 104 in an area 120 have the same cell-plan usage characteristic, then the protocol may be configured to select the vehicle having the highest or lowest VIN as the group leader.

In one contemplated embodiment, geographic locations of the vehicles 104 in an area 120 are compared to select the group leader 128. For instance, the data-aggregation protocol may be configured to select as the group leader 128 the vehicle (I) being closest to a center of the area 120, (II) being closest to a beginning of a segment, or (III) having a desired proximity to a point or zone of interest, such as by being most near to, or farthest from, a traffic accident. In a particular contemplated embodiment, the algorithm considers a concentration(s) or distribution(s) of vehicles 104 in the area 120 in defining group-leader selection criteria, or otherwise in selecting group leaders.

In one contemplated embodiment, the protocol goes through a series of three or more steps of comparison, as needed, to identify the leader vehicle when initial basis(es) for selection do not distinguish the vehicles 104. For example, the data-aggregation protocol could be configured so that a number of remaining cell-plan minutes is first compared and, if two or more vehicles have the same number of remaining minutes, the protocol automatically determines whether either of the tied vehicles have a higher percentage or ratio of cell-plan minutes remaining. If that consideration also results in a tie, then the protocol can automatically proceed to a next tier in the consideration process, such as a tier in which VINs are compared.

It is further contemplated that the data-aggregation algorithm could be configured to evaluate vehicle 104 qualifications for being a group leader. Exemplary vehicle qualifications for consideration in identifying one or more group leader vehicles 128, 130, 132, 134 include whether vehicles 104 include required or preferred software or hardware (e.g., cellular communications transceiver), location of vehicles 104 within the data-aggregation region 118, location of vehicles 104 within a corresponding data-aggregation areas 120, 122, 124, 126 (e.g., a center of the zone is generally preferred or more preferred, and adjacent an edge is generally not or less preferred), direction of travel of vehicles 104 within the data-aggregation region 118 or data-aggregation area 120, 122, 124, 126, number of recent and/or historic communications of vehicles 104, and number or nature of recent and/or historic communications of vehicles 104. In at least some of these embodiments, the data-aggregation algorithm is configured to select one or more leader vehicles allowing for the most efficient procurement of accurate data.

In one contemplated embodiment, the data-aggregation algorithm enables selection of one or more group leader vehicles without reference to data-aggregation areas. The algorithm could select some group leader vehicles using an area-based format, and some without. For example, the data-aggregation algorithm in the central server 110 and/or vehicles 104 may be configured to recognize certain vehicles 104 as automatic leaders, or leaders under certain circumstances (e.g., time of day, based on their location at the time).

Using given characteristics of vehicles (such as mobility characteristics, resource levels, or other unique characteristics of particular vehicle systems), such non-zone-based determinations may identify, for example, a taxi cab or a postal delivery vehicle, or any vehicle known or expected to move about the region 118 or within one or more data-aggregation area 120, 122, 124, 126.

V. DATA AGGREGATION

A. Data Collection

Data collection is initiated by each group leader 128, 130, 132, 134 in response to a stimulus, such as a request or instruction message from the remote sub-system 102. In some embodiments, each group leader 128, 130, 132, 134 commences data collection automatically upon being assigned as group leader, or upon determining itself as a group leader.

The data-aggregation protocol stored in each group leader and/or received in a data-request message, such as a message from the remote sub-system 102, causes the group leader to query the other vehicles 104 in its area 120 for sought data by short-range communication, such as via WI-FI®, DSCR, or other short-range communication, and via one or multiple hops. The query may be particular to a type or piece of data, such as a request for traffic conditions and velocity, or more general, such as a request for a report or list of a multitude of telematics-related characteristics. In the latter case, the leader 120 could select, from the lists, the data that is required for preparing the data-aggregation report for being transmitted (e.g., uploaded) to the remote sub-system 102 (e.g., traffic center).

One benefit of such call-and-response formats is that unneeded broadcasts from non-leader vehicles 104 can be avoided as the group leader 120 would receive the data directly from each reporting vehicle 104. In some embodiments, the group leader 120 provides a confirmation of receipt message back to the reporting vehicle 104 from which data was received, in scenarios in which the data was sent in response to a request and those in which not, so that the reporting vehicle 104 can determine that it does not need to resend the data.

In some embodiments, the group leader 128 broadcasts a message indicating that it is the group leader, and the non-leader vehicles 104, in response, transmit information to the group leader 128 in reply, such as by a message broadcast or a message sent specifically to the group leader 128. In some embodiments, each vehicle 104 broadcasts particular or general telematics-related characteristics independent of any request from the group leader 120 (i.e., the group leader request not needed) and only the group leader 128 collects the data.

Each group leader 128, 130, 132, 134 collects data, such as data regarding traffic reports, from the other vehicles 104 in the respective areas 120, 122, 124, 126 until a factor indicating closure of collection is present. Exemplary traffic report data could include, for instance, data about an accident or a rate of traffic in one or more stretches of road. One contemplated factor is a communication from the remote sub-system 102 (e.g., traffic center) indicating that the group leader 128 report should conclude data collection, or generate and upload its data report. In some embodiments, the data-collection algorithm is stored in each group leader 128, 130, 132, 134, and/or received in an instruction or request message regarding data collection, and identifies a threshold, such as one of those described below. In some embodiments, the leaders collect data until the threshold is reached, and in some particular embodiments the leaders collect data until the threshold is reached before the aggregated data could be uploaded.

B. Data-Collection Thresholds

The data-aggregation algorithm is configured in some embodiments to cause each group leader 128, 130, 132, 134 to collect data from peer vehicles 104 in their respective areas 120, 122, 124, 126 until a specified threshold is met. As an example, FIG. 2 shows a graph 200 illustrating an embodiment for determining whether a particular group leader 128 has received sufficient reports from the peer vehicles 104 in its area 120 based on whether a value of a relative standard error function is beyond a predetermined (e.g., long previously or recently determined) threshold.

Figure 2:
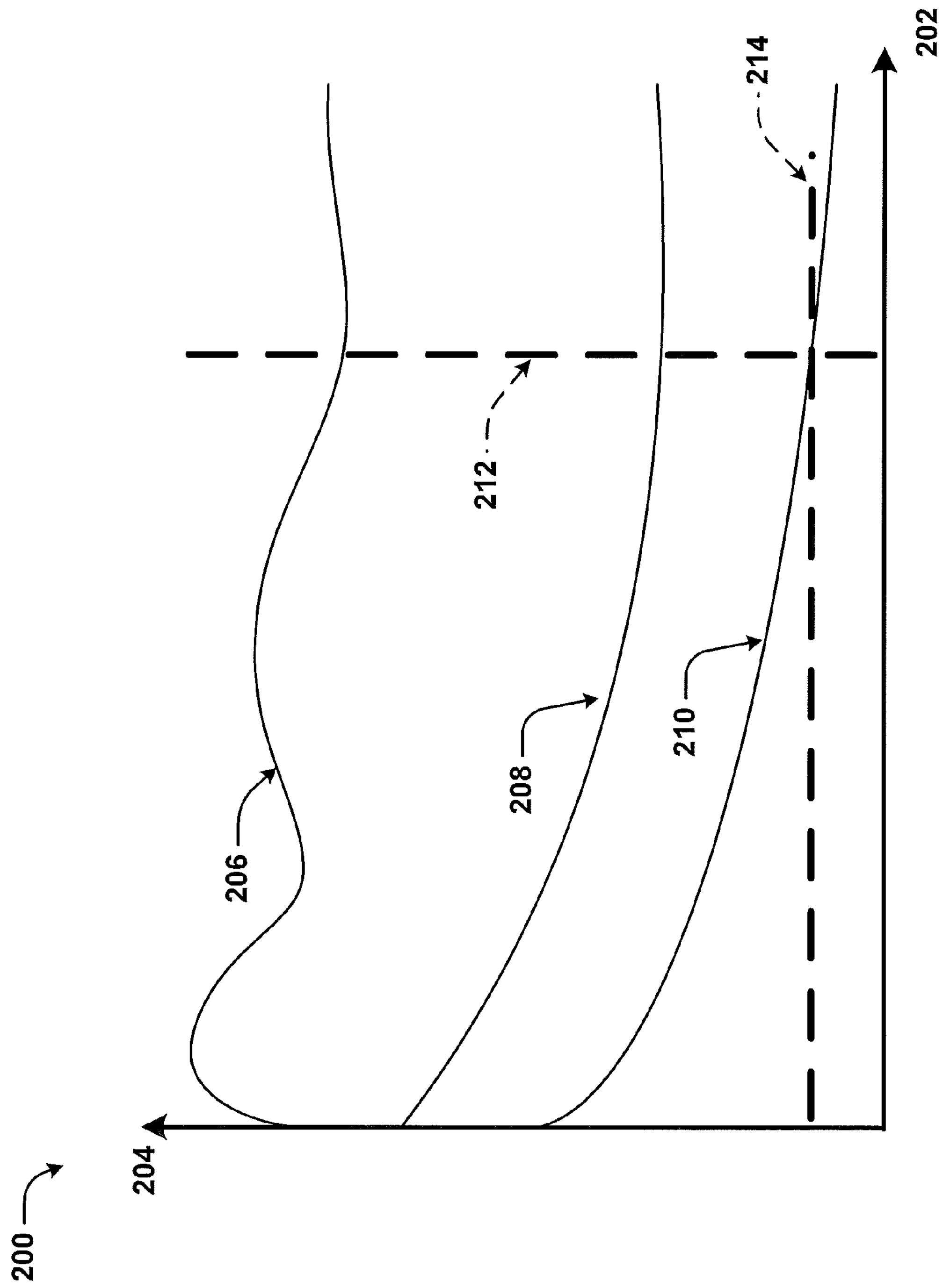
FIG. 2 shows a graph 200 illustrating an embodiment for determining whether a particular group leader 128 has received sufficient reports from other vehicles, according to an embodiment of the present disclosure.

The x-axis 202 in FIG. 2 represents a number of vehicle reports received by the particular group leader 128. The y-axis 204 is a unit-less axis against which increases and decreases of a mean 206, a standard error 208, and a relative standard error 210 with respect to particular data are shown as the number of vehicle reports increases.

The variables can be modeled with respect to a particular type of traffic information. In one embodiment, the mean 206 with respect to pieces of independent information x received by the group leader 128 from the vehicles 104 in the area 120 is given by:

$$\overline{m} = \frac{1}{n}\sum_{i=1}^{n} x_i$$

where n is a positive integer representing a number of vehicles 104 in the data-aggregation area 120 from which the particular group leader 128 has received the information x.

In one embodiment, the standard error 208 with respect to the pieces of information x is given by:

$$s = \frac{\sigma}{\sqrt{n}} = \frac{1}{\sqrt{n}}\sqrt{\frac{1}{n-1}\sum_{i=1}^{n}(x_i - \overline{m})}$$

where σ is a standard deviation.

In one embodiment, the relative standard error 210 with respect to the pieces of information x is given by:

$$rse = \frac{s}{m} = \frac{\sqrt{\frac{n}{n-1}\sum_{i=1}^{n}(x_i - \overline{m})}}{\sum_{i=1}^{n} x_i}$$

According to the data-aggregation algorithm stored in its computer-readable medium, the group leader 128 updates the mean $\overline{m}$/206, standard error s/208, and relative standard error RSE/210 every time the group leader 128 receives a piece of information x from another vehicle 104 in the area 120 (i.e., each time n is increased).

In some embodiments, the data-aggregation algorithm stored in the computer-readable medium of the group leader 128 causes the processor of the vehicle 128 to cease collecting data from the other vehicles 104 in the area 120 once its RSE is equal to, or in some embodiments, lower than, a given threshold 214, which is illustrated in FIG. 2. The number of reports n at which point the threshold relative standard error 214 is reached can be represented as n'.

In some embodiments, the threshold 214 is established by the central server 110, or personnel at the remote sub-system 102, e.g., traffic center, and provided to the group leader 128. For instance, the threshold 214 may be provided to the group leader 128 in a request for the information transmitted to the group leader 128 by a centralized entity, such as one or more traffic centers. The threshold 214 could also be a static or dynamic aspect of the data-aggregation algorithm, or protocol, programmed into each group leader 128. In some embodiments, the value of the threshold 214 depends on one or more factors selected from: time sensitivity for receiving the data (or, a tolerance for latency), desired accuracy for the data (as, generally, the more data points included in the report, the more accurate the data), calculations related to data redundancy (e.g., variables considered toward the goal of having the group leader 128 avoid receiving any or much redundant data), and others.

It is contemplated that the data-aggregation algorithm stored in the computer-readable medium of the group leader 128 may be configured to cause the group leader 128 to complete its data collection based on other types of thresholds, regarding other characteristics, other than that described in connection with the relative standard error. For instance, it is contemplated that the data-aggregation algorithm may be configured to cause the group leader 128 to stop collecting data from the other vehicles 104 in its area 120 after passage of a certain period of time.

As another example, it is contemplated that the data-aggregation algorithm may be configured to cause the group leader 128 to stop collecting data from the other vehicles 104 in its area 120 after data has been received from a certain number of vehicles.

The applicable threshold could also be a combination of any of the above factors for triggering the group leader 128 to stop data collection.

C. Data Report Generation

Once the group leader 128, 130, 132, 134 completes its respective data collection, the group leader prepares an aggregate, or consensus, report corresponding to its data-aggregation area 120, 122, 124, 126 for transmitting (e.g., uploading) to the remote sub-system 102 (e.g., the central server 110 of a traffic center).

The group leader 128, 130, 132, 134 then uploads its consensus report to the remote sub-system 102, such as via long-range communications (e.g., cellular radio). As provided above, long-distance communications can also include transmissions to and from roadside transmitters or transceivers, or other transportation network infrastructure (not shown). This may in some instances provide a way for reporting data in connection with a remote or urban area lacking reliable access to long-range communication. Any needed instructions facilitating transmission of the aggregation report through non-vehicle nodes are provided in the data-aggregation algorithm (e.g., a data-aggregation protocol) in the on-board computers of at least the group leaders 128, 130, 132, 134 and/or in an instruction and/or request message from the remote sub-system 102 (e.g., central server 110 of traffic center).

In uploading the group or area reports, the group leaders 128, 130, 132, 134 represent the vehicles in the respective areas 104. In this way, the non-group leaders 104 do not need to provide the data incorporated in the report to the remote sub-system, and indeed the non-group leaders 104 could simply be silent at this stage.

VI. METHODS OF OPERATION

Figure 3:
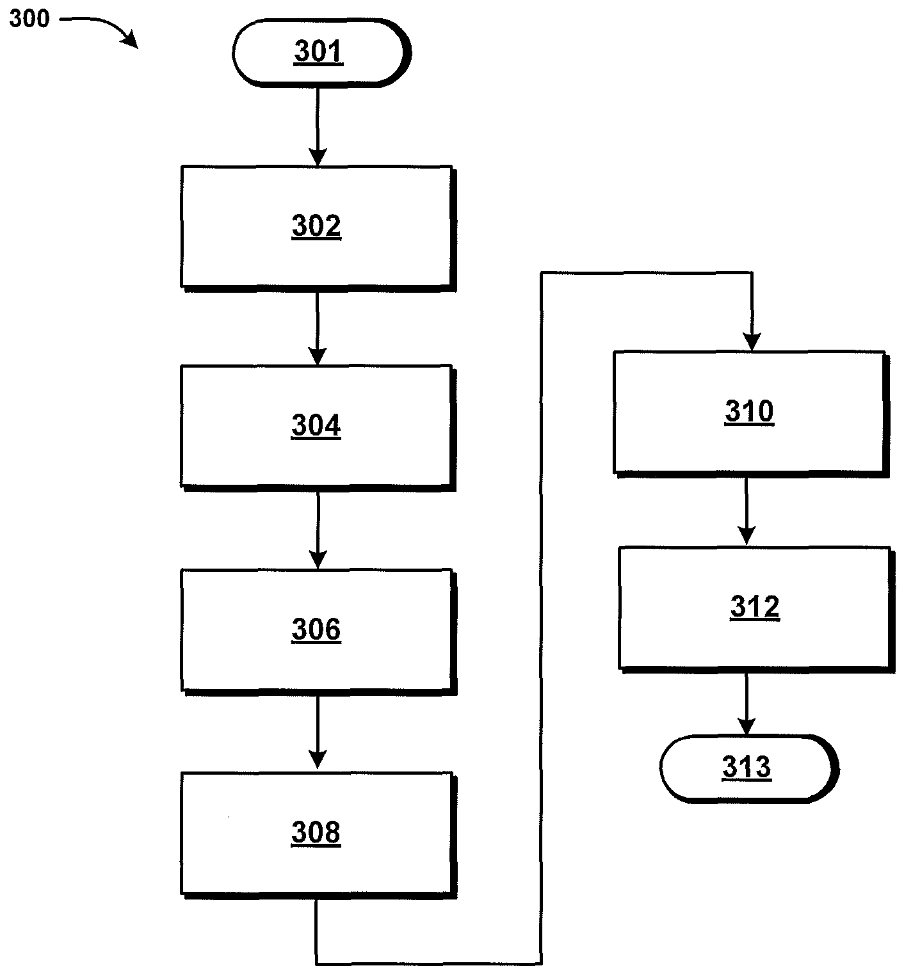
FIG. 3 shows a method 300 for aggregating information from a plurality of geographically-dispersed vehicles by way of short-range communications between vehicles and long-range communications from at least one selected aggregation vehicle, according to an embodiment of the present disclosure.

FIG. 3 shows an exemplary method 300 for procuring data using select group leaders, according to an embodiment of the present disclosure. It should be understood that the steps of the method 300 are not necessarily presented in any particular order and that performance of some or all the steps in an alternative order is possible and is contemplated.

The steps have been presented in the demonstrated order for ease of description and illustration. Steps can be added, omitted and/or performed simultaneously without departing from the scope of the appended claims. It should also be understood that the illustrated method 300 can be ended at any time. In certain embodiments, some or all steps of this process, and/or substantially equivalent steps are performed by execution of computer-readable instructions stored or included on a computer-readable medium, for example. For instance, references to a processor performing functions of the present disclosure refer to any one or more interworking computing components executing instructions, such as in the form of an algorithm, provided on a computer-readable medium, such as a memory associated with the processor of the central server 110 of the remote sub-system 102. It is contemplated that in some embodiments, some of the steps provided below are performed by one or more of the on-board computers of the vehicles 104.

The method 300 begins 301 and flow proceeds to step 302, whereat a data-aggregation region 118 (shown in FIG. 1) is defined. Step 302 may be performed by the remote sub-system 102, such as the central server 110. As provided above, the data-aggregation region 118 may be a country, state, metropolitan area, city, highway, portions of these, or other region. The region 118 may be defined to have any size or shape, such as rectangle, pentagon, hexagon, other regular or irregular polygons, circle, oval, and non-descript shapes. Boundaries of the data-aggregation region 118 are in various embodiments described in various ways, including at least in part by geographic coordinates (e.g., latitude and longitude) or GPS coordinates.

At step 304, the remote sub-system 102 defines one or more data-aggregation areas 120, 122, 124, 126 of the region 118. In one embodiment, the central server 110 identifies the data-aggregation areas 120, 122, 124, 126. The data-aggregation areas 120, 122, 124, 126 may have any size or shape. Boundaries of the zones are in various embodiments described in various ways, including, as with the data-aggregation region 118, at least in part by geographic coordinates or GPS coordinates. As described above, the areas may be generally static or dynamic, or determined per based on data-procurement variables (e.g., desired accuracy, latency tolerance, cost, etc.).

At step 306, at least one group leader 128, 130, 132, 134 is identified per data-aggregation area 120, 122, 124, 126. The group leaders 128, 130, 132, 134 can be selected based on at least one arbitrary distinguishing characteristic (e.g., highest or lowest VIN), at least one strategic characteristic (e.g., cellular-plan usage level), or a combination of these, as described in more detail above. Factors for leader selection in some embodiments include a factor such as location of the vehicles in the subject the data-aggregation area, concentration(s) or distribution(s) of vehicles 104 in the data-aggregation area 120, 122, 124, 126.

The data-aggregation algorithm could be configured to evaluate vehicle 104 qualifications for being a group leader. Exemplary vehicle qualifications for consideration in identifying one or more group leaders 128, 130, 132, 134 in step 306 include whether vehicles 104 include required or preferred software or hardware (e.g., cellular communications transceiver), location of vehicles 104 within the data-aggregation region 118, location of vehicles 104 within a corresponding data-aggregation areas 120, 122, 124, 126 (e.g., a center of the zone is generally preferred or more preferred, and adjacent an edge is generally not or less preferred), direction of travel of vehicles 104 within the data-aggregation region 118 or data-aggregation area 120, 122, 124, 126, number of recent and/or historic communications of vehicles 104, and number or nature of recent and/or historic communications of vehicles 104. In such embodiments, the data-aggregation algorithm is configured to select one or more group leaders allowing for the most efficient procurement of accurate data.

As provided above, the data-aggregation algorithm in some cases enables selection of one or more group leaders without reference to data-aggregation areas. The algorithm could select some group leaders with the area-based format, and some without. For example, the data-aggregation algorithm in the central server 110 and/or vehicles 104 may be configured to recognize certain vehicles 104 as automatic leaders, or leaders under certain circumstances (e.g., time of day, based on their location at the time). Such non-area-based leaders may include, for example, a taxi cab or a postal delivery vehicle, or any vehicle known or expected to move about the region 118. Or related to areas, a certain vehicle can be selected as a leader for a certain area based on the fact that it is in the area at the time, and has other desired characteristics—e.g., a cab will likely be able to communicate directly with many peer vehicles 104.

Following step 306, at step 308, each group leader 128, 130, 132, 134 collects data. As provided above, data collection is performed in some embodiments by each group leader querying peer vehicles 104 in its area 120 for sought data (e.g., vehicle position and velocity) by short-range communication, such as via WI-FI®, DSCR, or other short-range communication, via one or multiple hops. In response, the non-leaders 104, transmit information to the group leader 128 in reply, such as by a message broadcast or a message sent specifically to the group leader 128.

The group leader 128, in some embodiments, broadcasts a message indicating that it is the group leader, with or without expressly requesting data, as part of the data collection step 306. In response, the non-group leaders 104 transmit information to the group leader 128.

At step 310, the processor of each group leader 128, 130, 132, 134, executing instructions in memory of the vehicle, determines that data collection should stop. Particularly, each group leader 128, 130, 132, 134 collects data in the collection step 308 from the other vehicles 104 in the respective areas 120, 122, 124, 126 until a factor indicating closure of the collection. For instance, in some embodiments, the data-collection algorithm in each group leader 128, 130, 132, 134 identifies a threshold, and the leaders collect data until the threshold is reached.

As an exemplary threshold for consideration in step 310, the data-aggregation algorithm of each group leader 128, 130, 132, 134 causes the vehicle to collect data from peer vehicles 104 in their respective areas 120, 122, 124, 126 until a relative standard error is at or beyond a threshold. This process is described in greater detail above in connection with FIG. 2.

And as also provided, above, the data-aggregation algorithm could be configured to cause the group leader 128 to stop data collection based on thresholds other than a relative-standard-error threshold. For instance, it is contemplated that the data-aggregation algorithm may be configured to cause the group leader 128 to stop collecting data from the other vehicles 104 in its area 120 after passage of a certain period of time, or after data has been received from a certain number of vehicles.

At step 312, each group leader 128, 130, 132, 134 generates a data-aggregation, or consensus, report and uploads it, such as to the remote-sub system 102 (e.g., traffic center). The upload may be made, for instance, via long-distance communication—e.g., cellular radio connection. In uploading the group or area reports, the group leaders 128, 130, 132, 134 represent the vehicles in the respective areas 104, and so the non-group leaders 104 can stay silent during delivery of the report(s).

The method 300 may be repeated for procurement of updated or other data, and may end 313.

VII. EXEMPLARY BENEFITS

The technology of the present disclosure has a wide variety of benefits. As provided, procuring data (e.g., vehicle traffic information) via group leaders reduces use of long-distance communications (e.g., cellular) systems. Limited usage of long-distance communications can save financial cost and limit burden on the long-distance network. Offloading data traffic from long-distance communications system can be especially beneficial to the communications system during peak hours of operation, when it is most burdensome and costly to use the network.

Data obtained via group leaders and consensus reports generated thereby according to the present disclosure also has greater accuracy and reliability than data obtained directly from fewer vehicles than a number of vehicles contributing to the consensus reports. Telematics-related data, such as traffic data, of increased quality can be used to improve a variety of services, such as determination of traffic information.

Obtaining accurate information from group leaders, as provided herein also enables more effective use of applications that are otherwise inefficient or cost-prohibitive when using only cellular radio, such as traffic probe applications.

Efficient procurement of accurate information from group leaders, as provided herein also facilitates data collection in scenarios in which some vehicles do not have reliable long-range communications, due for example to lack of required software or hardware, or to being out of range of required communications infrastructure (e.g., cellular base stations), such as is common in urban and rural areas.

Aggregating data at vehicles present in areas also avoids report to the remote sub-system 102 of redundant data, as such redundant data is combined into the single, consolidated report. Further accuracy is increased because similar characteristics or happenings, such as traffic phenomena, are analyzed by a variety of vehicles being in the area. Data from vehicles, even if located in the same vicinity, will differ slightly based on perspective, sensor(s) used, sensor accuracy, observation errors, and the like, and so the aggregation of their reports provides an enhanced understanding of the characteristics or happenings.

Provided information could include information about dynamic or static characteristics, such as regarding traffic accidents, traffic congestion, road conditions (e.g., icy bridge, slippery road, pothole), and weather (e.g., fog, rain, snow).

By using the long-range network to receive aggregate data from a relatively-small subset of the total vehicles 104, detriments such as burden on the long-range network and cost of communications are greatly reduced as compared with the conventional procedure of communicating data to the remote sub-system 102 from every vehicle 104 via long-range communication 106.

And, as provided above, in some embodiments, the group leaders 128, 130, 132, 134 provide a confirmation of receipt of data to any vehicle 104 having provided its data to the group leader, and the vehicle 104 from which the data has been received discontinues broadcasting or otherwise transmitting the data. Benefits of this approach include limiting short-range communication traffic.

X. CONCLUSION

Various embodiments of the present disclosure are disclosed herein. The disclosed embodiments are merely examples that may be embodied in various and alternative forms, and combinations thereof. As used herein, for example, "exemplary," and similar terms, refer expansively to embodiments that serve as an illustration, specimen, model or pattern.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art.

The law does not require and it is economically prohibitive to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A method, or intelligent procurement of data from a plurality of automotive vehicles, comprising:

determining, by a central server using a computer processor, a plurality of data-aggregation areas;

determining a group leader vehicle for each data-aggregation area determined; and receiving, from the group leader vehicle of each data-aggregation area, a consensus report generated by the group leader vehicle using data collected, by the group leader vehicle, from other vehicles in the data-aggregation area, using short-range communications, until the group leader vehicle determined to cease collecting the data.

2. The method of claim 1, wherein determining the group leader vehicle is performed according to a data-aggregation protocol, including according to a distinguishing arbitrary characteristic associated with the vehicles in the data-aggregation area.

3. The method of claim 2, wherein determining the group leader vehicle according to the distinguishing arbitrary characteristic includes determining the group leader vehicle as a vehicle being associated with a most-extreme unique identification number, being a highest or lowest identification number.

4. The method of claim 1, wherein determining the group leader is performed according to a data-aggregation protocol, including according to a strategic characteristic associated with the vehicles in the data-aggregation area and a pre-determined benefit.

5. The method of claim 4, wherein determining the group leader vehicle according to the strategic characteristic includes determining the group leader vehicle as a vehicle having a most-extreme communications-plan usage quality.

6. The method of claim 5, wherein determining the group leader vehicle as the vehicle having the most-extreme communications quality includes determining the group leader vehicle as the vehicle having one of:

a highest number of minutes remaining on account in a long-range communications plan associated with the vehicle;

a lowest use of an allocation in the long-range communications plan associated with the vehicle; and a lowest percentage or ratio of use in the long-range communications plan associated with the vehicle.

7. The method of claim 1, wherein the group leader vehicle of each data-aggregation area determines to cease collecting data in response to determining that a pre-determined threshold value has been met.

8. The method of claim 7, wherein the group leader vehicle determining that the pre-determined threshold value has been met includes the group leader vehicle determining that a result of a relative-standard-error calculation has been lower than a relative-standard-error threshold.

9. The method of claim 7, wherein the group leader vehicle determining that the pre-determined threshold value has been met includes the group leader vehicle determining that:

data has been received from a pre-determined number of vehicles; or a pre-set amount of time has passed.

10. A tangible computer-readable storage device comprising instructions that include a data-aggregation protocol and, when executed by a processor, cause the processor to perform operations, for intelligent procurement of data from a plurality of automotive vehicles positioned in a data-aggregation region, comprising:

determining a plurality of data-aggregation areas;

determining a group leader vehicle, for each data-aggregation area, of the vehicles positioned in the data-aggregation area; and receiving from the group leader vehicle of each data-aggregation area, a consensus report generated by the group leader vehicle using data collected by the group leader vehicle, using the data-aggregation protocol and short-range communications, from other vehicles in the data-aggregation area, until the group leader vehicle determined to cease collecting the data.

11. The tangible computer-readable storage device of claim 10, wherein the group leader vehicle determines, according to the data-aggregation protocol, to cease collecting data by determining that a pre-determined threshold value has been met.

12. The tangible computer-readable storage device of claim 10, wherein the operation of determining the group leader vehicle for each data-aggregation area comprises determining the group leader according to a characteristic selected from a group consisting of:

a distinguishing arbitrary characteristic associated with the vehicles in the data-aggregation area; and a strategic characteristic associated with the vehicles in the data-aggregation area and a pre-determined benefit.

13. The method, for intelligent procurement of data, of claim 1, wherein, to determine the areas and group leader vehicle, the processor of the central server executes a data-aggregation protocol stored at a memory of the central server, and to generate and transmit, to the central server, the consensus report, a processor of the group leader vehicle executes the data-aggregation protocol, being stored at a memory of the group leader vehicle.

14. A tangible computer-readable storage device, for use at an automotive vehicle when positioned in a pre-defined data-aggregation area, comprising instructions that include a data-aggregation protocol and, when executed by a processor, cause the processor to perform operations, comprising:

determining a group leader vehicle for the data-aggregation area by communicating with processors of other automotive vehicles positioned in the data-aggregation area and executing the data-aggregation protocol; and responsive to determining that the automotive vehicle is the group leader vehicle for the data-aggregation area:

collecting data from processors of other vehicles in the data-aggregation area using short-range communications;

determining to cease collecting data from the other vehicles in the data-aggregation area; and generating a consensus report using the data collected from the other vehicles in its data-aggregation area.

15. The tangible computer-readable storage device of claim 14, wherein the operation of determining the group leader vehicle comprises determining the group leader vehicle according to a characteristic selected from a group consisting of:

a distinguishing arbitrary characteristic associated with the vehicles in the data-aggregation area; and a strategic characteristic associated with the vehicles in the data-aggregation area and a pre-determined benefit.

16. The tangible computer-readable storage device of claim 15, wherein determining the group leader vehicle according to the distinguishing arbitrary characteristic includes determining the group leader vehicle as a vehicle being associated with a most-extreme unique identification number, being a highest or lowest identification number.

17. The tangible computer-readable storage device of claim 15, wherein determining the group leader vehicle according to the strategic characteristic includes determining the group leader vehicle as a vehicle having a most-extreme communications-plan usage quality.

18. The tangible computer-readable storage device of claim 17, wherein determining the group leader vehicle as the vehicle having the most-extreme communications quality includes determining the group leader vehicle as the vehicle having a quality selected from a group consisting of:

a highest number of minutes remaining on account in a long-range communications plan associated with the vehicle;

a lowest use of an allocation in the long-range communications plan associated with the vehicle; and a lowest percentage or ratio of use in the long-range communications plan associated with the vehicle.

19. The tangible computer-readable storage device of claim 14, wherein the operation of determining to cease collecting data includes determining that a pre-determined threshold value has been met.

20. The tangible computer-readable storage device of claim 19, wherein:

the operation of determining that the pre-determined threshold value has been met comprises making a determination, selected from a group of determinations consisting of:

determining that a result of a relative-standard-error (RSE) calculation has been lower than a relative-standard-error (RSE) threshold, the RSE calculation being given by:

$$rse = \frac{s}{\overline{m}} = \frac{\sqrt{\frac{n}{n-1}\sum_{i=1}^{n}(x_i - \overline{m})}}{\sum_{i=1}^{n} x_i}$$

where n is the number of vehicles from which data has been received, s is a standard error, and $\overline{m}$ is a mean;

determining that data has been received from a pre-determined number of vehicles; and determining that a pre-set amount of time has passed.

* * * * *